Aug. 6, 1963 J. W. VERBA ETAL 3,100,263
CONTINUOUS ROTATION SCATTERING CHAMBER
Filed Feb. 21, 1962 2 Sheets-Sheet 2
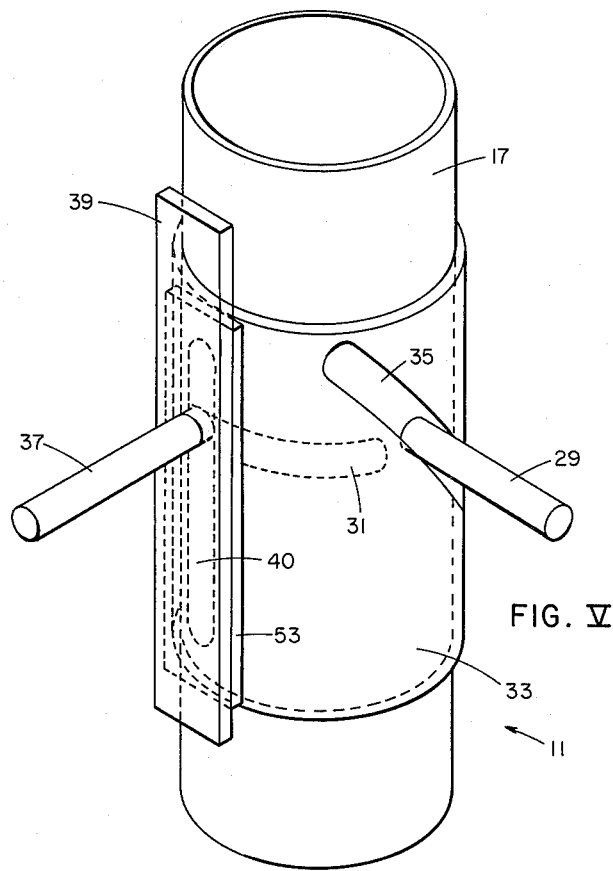
FIG. V
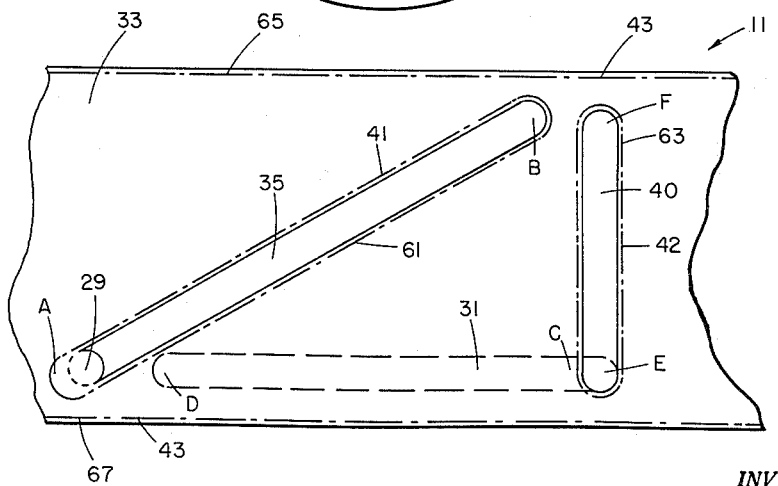
FIG. VI
INVENTOR.
JOHN W. VERBA
ROMAN A. HAWRYLAK
BY
ATTORNEY ---
United States Patent Office 3,100,263
Patented Aug. 6, 1963

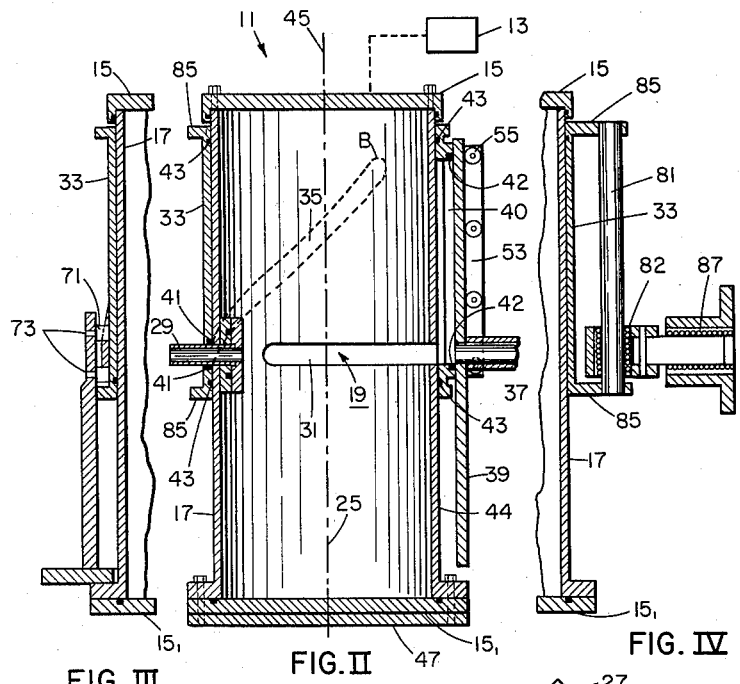
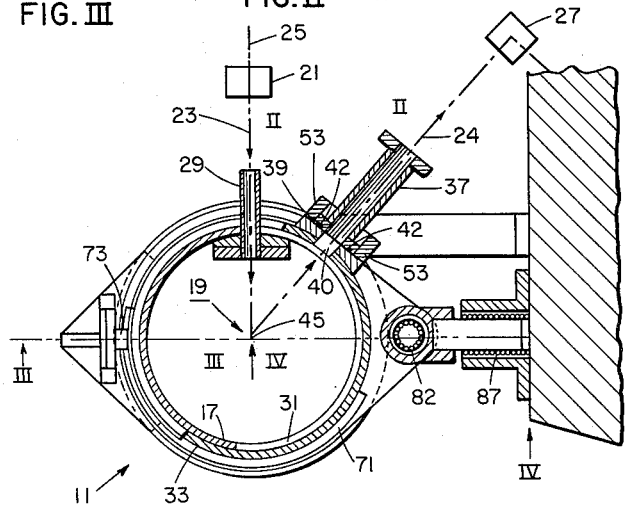

---

3,100,263
CONTINUOUS ROTATION SCATTERING CHAMBER
John W. Verba and Roman A. Hawrylak, Rochester, N.Y., assignors to the United States of America as represented by the United States Atomic Energy Commission
Filed Feb. 21, 1962, Ser. No. 174,926
9 Claims. (Cl. 250—83)

This invention relates to evacuated scattering chambers in which nuclear reaction products are produced by the bombardment of a target with an incoming horizontal beam of energetic sub-atomic materials and more particularly to evacuated scattering chambers for use in observing nuclear reaction products produced therein over a wide range of scattering angles from an incoming horizontal beam used for bombarding a target to produce the reaction products.

In the study of nuclear structure by means of nuclear reactions, horizontal beams of energetic incident particles from cyclotrons, and the like, have been bombarded against gaseous or solid targets in evacuated nuclear scattering chambers and the angular distributions of the charged reaction products or scattered particles in the horizontal plane have been studied by rotating detection apparatus such as spectrometers around the target. This has caused problems in preventing the breaking of the vacuum in the scattering chamber or in continuously rotating the detector over a broad range of angles from the incoming beam, particularly since the incident beam and inlet port for the detector have both been substantially horizontally orientated due to the size, weight or complexity of the components, the hazardous radiation levels around the beam source and the detector or the special manipulation required for nuclear particles. Additionally, it has been desirable to have a simple, rapid and continuous change of observation angles from the input beam in an approximately horizontal plane and to eliminate the interposition of a plurality of windows in the containers holding the target.

In accordance with this invention an improved evacuated scattering chamber is provided having a helically moving member that couples the chamber to the detector and permits a rapid and broad change of observation angles without breaching the vacuum in the chamber. More particularly this invention contemplates a scattering chamber, comprising a first cylinder having a target therein, a second concentric cylinder, means for directing an input beam of nuclear particles through said cylinders and against said target so as to produce reaction products, output means for directing said products through said cylinders and away from said target in a plane passing through said beam, and sealing means in operable association with said cylinders for preventing the flow of atmospheric air into said first cylinder, said output means providing for the continuous movement of said second cylinder helically relative to said first cylinder while said input means remains stationary and said output means is biased in a plane passing through said input beam to remove said reaction products from said target over a broad range of angles relative to said input beams.

The above and further novel features of this invention will appear more fully from the following detailed description when the same is read in connection with the accompanying drawings. It is to be expressly understood, however, that the drawings are not intended as a definition of the invention but are for the purpose of illustration only.

In the drawings where like elements are marked alike:

FIG. 1 is a partial cross section of a scattering chamber of this invention with the output tube thereof set at a backward angle of about 140° to the input beam therefor;

FIG. 2 is a partial cross section of FIG. 1 through II—II;

FIG. 3 is a partial cross section of FIG. 1 through III—III;

FIG. 4 is a partial cross section of FIG. 1 through IV—IV;

FIG. 5 is a partial isometric view of the apparatus of FIG. 1 with dashed lines schematically showing the seals therefor;

FIG. 6 is a schematic planer development of the interface between the main cylinder and sleeve of FIG. 1 with dashed lines schematically indicating openings in the cylinder and dot-dashed lines schematically representing elongated annular neoprene seals having cylindrical cross sections around slots in the sleeve.

Referring to FIGS. 1 and 2, scattering chamber 11 has a suitable evacuating means, such as a vacuum pump 13, connected through end plate 15 of cylinder 17, for establishing a vacuum in the cylinder 17. The cylinder 17 has a solid or gaseous target 19 therein, designated for convenience as a hydrogen target 19. A nuclear beam source 21, such as a proton beam producing cyclotron, directs its beam, designated generally at 23, against the target 19 and this produces reaction products such as scattered beam particles, designated generally at 24, which are useful generally in studying the basic structure of matter and specifically in studying the characteristics of the target atoms.

It has been necessary to collimate the reaction products and to transmit them over a wide range of angles from the axis 25 of beam 23 to an observation detector 27, e.g., a recording detection means 27 such as a magnetic spectrometer having a nuclear camera emulsion, a bank of solid state counters, or the like (not shown). Heretofore, however, the angle range of observation has been limited or narrow, the vacuum in the chamber has been breached, or it has been difficult to observe the reaction products continuously over a broad range of angles. Moreover, it has been advantageous to have an improved apparatus that is fast acting, simple to operate, safe and continuous in its operation over a broad range of observation angles from the input beam axis in an approximately horizontal plane, and without the interposition of windows that would decrease the amount of reaction products available for observation.

In accordance with this invention, scattering chamber 11 has an input tube 29 for transmitting beam 23 into cylinder 17 from source 21, a horizontal slot 31 in the side of cylinder 17 for the observation of the reaction products produced therein by the bombardment of target 19 with beam 23, a concentric second cylinder 33 rotatable around the first or inside cylinder 17, a helical slot 35 in the side of the second or outer cylinder 33 through which the input tube 29 passes, an output tube 37 through a cover plate 39 adapted to rotate with the output tube 37 and outer cylinder 33 around the inner cylinder 17, said output 37 being adapted to communicate with the horizontal slot 31 through slot 40 in sleeve 33 which overlaps slot 31 normally thereto for the conduction of reaction products 24 to detector 27, said cover plate 39 covering vertical slot 40 in cylinder 33 and being also moveable with output tube 37 vertically relative to sleeve cylinder 33 to permit the reciprocation of sleeve 33 vertically, and sealing means 41, 42 and 43 in sleeve 33 and in operable association with the outside surface 44 of cylinder 17, and the cover 39 to prevent air from leaking into cylinder 17.

Advantageously, cylinder 17 has a fixed axis 45 around which spectrometer 27 rotates, a fixed base 47, a fixed horizontally orientated input tube 29 which transmits penetrating radiation 23 from a fixed cyclotron beam source 21 against target 19 in cylinder 17, a fixed end plate 15, through which gaseous targets are transmitted or with which solid targets are attached for support in cylinder 17 if desired, and a fixed end plate 15, through which pump 13 removes gas from cylinder 17 to maintain a low pressure in the cylinder 17 equal to the pressure in the cyclotron 21, e.g., $5 \times 10^{-6}$ to $10^{-5}$ millimeters of mercury. The horizontal slot 31 has a co-planar relation with beam 23 and extends around axis 45 over a desired angular range of observation. In the model described herein the angular range extends from $-5°$ to $+165°$. However, by adding suitable supports for cylinder 17 and cylinder 33, the angular range could be extended to almost 360°, e.g. up to about $\pm 175°$ from the beam 23 for the receipt of reaction products 24 and the transmittal thereof through output tube 37 to spectrometer.

Cylindrical sleeve 33 rotates on inner cylinder 17 and couples the inside of inner cylinder 17 to the spectrometer 27 through horizontal slot 31. To this end vertical slot 40 in outer sleeve 33 crosses or overlaps horizontal slot 31 at right angles thereto and it is through this crossing that the port of the detector 27 sees the target 19. Helical slot 35 in sleeve 33 receives cyclotron beam pipe 29 and the input pipe 29 and main cylinder 17 remain fixed so that the helical slot 35 constrains the sleeve 33 to a simultaneous vertical and rotational motion, i.e., a helical motion.

Narrow plate 39 is fixed with outlet 37 and rotates around axis 45 with sleeve 33, outlet pipe 37 and spectrometer 27 in a horizontal planar orientation to beam 23. Plate 39 permits the described vertical movement of sleeve 33, however, while maintaining a cover over slot 40 in sleeve 33 and slot 31 in cylinder 17. To this end sleeve 33 has L-shaped shoulder portions 53 and suitable guide rollers 55 that contact the sides and outside respectively of plate 39 to hold the plate in between shoulders 53. The plate 39 is sufficiently long to cover vertical slot 40 over the full range of the vertical motion of sleeve 33. Also, the output 37 and cover 39 cover the portion of slot 31 that would otherwise be open to the air through slot 40 and maintains the output opening size substantially small and constant.

Resilient vacuum seals 41, 42 and 43 maintain the vacuum in cylinder 17 by preventing the leakage of atmospheric air into cylinder 17 through horizontal slot 31 in cylinder 17. To this end sleeve 33 carries an extended annular first groove 61 of small cross section on its inside around helical slot 35 and an extended annular second groove 63 of small cross section on shoulder sections 53 next to plate 39 and around vertical slot 40. Resilient helical slot sealing means 41 in groove 61 seals between the inside of sleeve 33 and the outside smooth surface 44 of cylinder 17 around helical slot 35 while cover plate sealing means 42 in groove 63 seals between the outside of shoulder section 53 of sleeve 33 and the inside of plate 39 around slot 40. Also, sealing means 43 in third and fourth grooves 65 and 67 respectively in the ends of sleeve 33 prevent the entry of air into cylinder 17 from the end of sleeve 33 between sleeve 33 and cylinder 17. The position of the seals, advantageously neoprene O-rings, is shown in FIG. 5 where the cover plate seal 42 is illustrated as sliding vertically relative to cover plate 39 while the other seals 41 and 43 are illustrated as sliding helically relative to cylinder 17. Rollers 55 rotate in shoulders 53 against the side of plate 39 to hold plate 39 in moveable relation to seal 42 while causing a slight compression of seal 42. The clearance between cylinder 17 and sleeve 33 is so small so as to compress seals 41 and 43 slightly and this slight compression causes the seals to block the flow of air across seals 41 and 43 while causing only slight friction to the movement of sleeve 33. It is noted that the helical inlet slot 35 does not communicate with the horizontal outlet slot 31 as illustrated in FIG. 6.

In an actual working embodiment, the main cylinder 17 has been an 8″ O.D. steel pipe of ¼″ wall thickness. Steel was chosen to insure rigidity under vacuum in the presence of horizontal slot 31 and to minimize marring of the smooth highly polished exterior surface 44 of cylinder 17 on which O-ring seals 41 and 43 slide. In providing gasket groove 61 on the inside of sleeve 33 around spiral slot 35 it has been found advantageous to insert in sleeve 33 two brass shells fitting tightly into each other. The spiral slot 35 on the inside shell has been wider than that of the external shell by twice the thickness of a standard O-ring. A copper strip retainer has been fitted along the edge of the slot 35 to hold the O-ring in place.

It may be advantageous to guide the sleeve 33 in its helical motion with a simple helical rail 71 of the same pitch as the slot 35. Such a rail 71 has been attached to the outside of the sleeve 33 and two needle bearings 73 securely braced to the chamber base 47 have served as guide posts for this rail as shown in FIG. 3. Also, if necessary additionally to transmit torque to sleeve 33 to cause the sleeve to rotate evenly with spectrometer 27, a vertical shaft 81 having a ball bushing 82 slidable thereon may be firmly attached to the top and bottom flanges 85 of sleeve 33 and this ball bushing 82 may be connected via a horizontal shaft into another like bushing 87 anchored on the spectrometer 27. The use of the ball bushing on the spectrometer although optional for the rotation of detector 27 to drive sleeve 33, has prevented lateral strains and distortion on the sleeve 33.

In operation cyclotron 21 directs a horizontal beam 23 of radiation, such as protons or deuterons up to about 20 mev. or over, at target 19 in chamber 11. The target scatters the beam materials over a broad range of angles in a horizontal plane. Horizontal inner cylinder slot 31 receives these reaction products continuously over a wide range of angles for transmission to detector 27 while helically rotatable sleeve 33 couples cylinder 17 to detector 27 selectively and continuously over a broad range of angles to beam 23 without breaching the vacuum in chamber 11.

In one cycle of operation, the helical slot 35 receives fixed input tube 29 at one end A thereof. Then spectrometer 27 is rotated in one direction around the axis 45 of cylinder 17. This causes output tube 37, and optional shaft 81 if included, to drive sleeve 33 around cylinder 17 while input tube 29 and helical slot 35 constrain sleeve 33 to a vertical movement. Sleeve 33 moves vertically relative to plate 39 in one direction and permits the relative vertical movement of plate 39 over slots 31 and 40 which cross at right angles so that there is a continuous selective communication of output tube 37 with target 19 through horizontal slot 31. This combination of vertical and rotational movement of sleeve 33 is a helical movement which has been found to permit the selective and continuous movement of output tube 37 over a broad range of angles to beam 23. Additionally, seal 43 prevents the flow of air into chamber 11 from the ends of sleeve 33, seal 41 prevents the flow of air into chamber 11 through helical slot 35 and seal 42 prevents the flow of air into chamber 11 through slot 40. The sleeve 33 reaches the end of its travel in one direction when input tube 29 is biased from one end to the other end of helical slot 35. This causes the travel of the output tube 37 over entire angular range, e.g., in one direction to end B of helical slot 35; and the movement of tube 37 from end C to end D of horizontal slot 31 and from end E to end F of vertical slot 40 while maintaining a high vacuum in chamber 11.

In the next sequence of this cycle of operation, spectrometer 27 is rotated in the opposite direction to transmit torque through output tube 37 to sleeve 33 to rotate the sleeve 33 in the opposite direction and to move the sleeve 33 vertically in the opposite direction relative to plate 39. Also, this moves the output tube 37 from end B of helical slot 35. When tube 37 butts again against the opposite end A of helical slot 35, then a cycle has been completed and the output tube has been moved in the opposite direction, up to about 350°, to its starting place. Meanwhile, this moves tube 37 from end D back to end C of slot 31 and from end F back to end E of slot 40 while the vacuum in chamber 11 has been maintained for the beginning of another cycle of operation as described above. Suitable indicia (not shown) along cylinders 17 and 33 indicate the degree of rotation of sleeve 33 relative to beam axis 25.

For best operation over extended periods of time the choice of lubricant for the seals and between the cylinders is important. Most vacuum greases work well when first applied, but may stiffen after the elapse of some time so as to present inordinate resistance to the motion of sleeve 33. Thinner greases provide positive sealing and very smooth motion although they run down the cylinder 17. Silicone stopcock grease has proved most satisfactory and with this type of grease the sleeve is easily turned by hand after the sleeve 33 has not been moved for long periods of time up to a week or more.

Actual tests have shown that the scattering chamber 11 and coupling of this invention have been completely satisfactory in operation over a period of at least four months and during this period the sleeve 33 has repeatedly been rotated during target bombardment with a full cyclotron beam 23 with no observable increase in pressure in chamber 11 or in the cyclotron 21 or in the magnetic spectrometer 27.

It is understood that the end plate 15, can be used for the insertion and holding of a solid target in cylinder 17 such as a gold, aluminum or other metal target.

The improved scattering chamber of this invention has a novel helical coupling, the advantages of continuous rotation under vacuum over an angular range of up to about ±175° from the beam axis, simple and rapid operation with standard horizontally orientated beam sources and detectors, and the provision for small inlet and outlet openings whose practical size remains constant.

What is claimed is:

1. A scattering chamber for observing horizontal nuclear reaction products produced therein by a horizontal nuclear beam, comprising an evacuated first cylinder having a fixed input tube for introducing said nuclear beam into said cylinder, said first cylinder also having a target therein against which said beam is adapted to be directed through said input tube to produce said reaction products, said first cylinder also forming a horizontal slot transverse to the axis of said first cylinder in the plane of said input tube for removing said reaction products from said first cylinder, a concentric second cylinder around said first cylinder having a helical second slot in which said input tube is adapted to be translated, said second cylinder also having a longitudinally extending third vertical slot which overlaps said horizontal slot at right angles thereto, a cover movable in said second cylinder over said third slot and having an output tube therethrough which communicates with said horizontal slot, sealing means between said first and second cylinders and around said second and third slots for preventing the flow of air from the atmosphere into said first cylinder through said horizontal slot, said second cylinder being adapted to be rotated relative to said first cylinder and the rotation of said second cylinder adapted selectively to guide said output tube easily in line with said target over a broad range of angles to said input tube in a horizontal plane.

2. A scattering chamber, comprising a first cylinder adapted to have a target therein, a second concentric cylinder, means for directing an input beam through said cylinder and against said target so as to produce reaction products, output means for directing said products through said cylinders and away from said target in a plane passing through said beam, and sealing means between said cylinders for preventing the flow of atmospheric air into said first cylinder, said output means providing for the movement of said second cylinder helically relative to said first cylinder and the continuous removal of said reaction products from said target over a broad range of angles relative to said input beam in a horizontal plane.

3. A scattering chamber comprising a first cylinder adapted to have a target therein, a second concentric cylinder, input means for directing an input beam against said target so as to produce reaction products, output means for directing said products away from said target in the plane of said input beam, said first and second cylinders having over-lapping longitudinally extending slots at right angles to each other for accommodating said cylinders and means for preventing the leakage of atmospheric air into said first cylinder, said second cylinder having a helical slot for accommodating said input means which when fixed permits a helical movement of said second cylinder to drive the output means continuously over a broad range of angles to said input means in a horizontal plane.

4. A scattering chamber comprising a first cylinder forming an enclosed chamber for containment of a target, a smooth cylindrical outside wall on said first cylinder formed with a slot therethrough that is transverse to the axis of said outside wall, a longitudinally extending input tube fixed in the wall of said first cylinder for directing particles against said target so as to produce reaction products at a broad range of angles from said tube, an open ended concentric second cylinder adjacent said outside wall and having a helical second slot and a longitudinally extending third slot that is adapted to overlap said transverse first slot and which terminates short of the open ends of said second cylinder, said second cylinder having a cover over said second slot and an output second tube passing therethrough which is adapted to be translated with said cover over the length of said first slot and said third slot, said cover having elongated annular resilient sealing means interposed between itself and said first cylinder and around said third slot, and said second cylinder having elongated annular resilient sealing means in grooves in one of said cylinders which hold said sealing means against the other cylinder for relative movement therewith and around said second slot so as to block the flow of atmospheric air into said chamber while permitting the continuous free helical movement of said second cylinder and quick translation of said output tube through a wide range of angles relative to said input tube for the removal of reaction products from said chamber in a horizontal plane.

5. A scattering chamber adapted to have a target from which reaction products travel in a wide range of angles, comprising a first cylinder having a transverse first slot and a fixed beam input tube for introducing particles into said chamber, a second concentric cylinder having a helical second slot in which said input tube is adapted to be translated, said second cylinder also having a third slot at right angles to and overlapping said transverse first slot, and an output tube translatable in said first and third slots for continuous collimation and observation of said particles over a wide range of angles to said input tube in a horizontal plane.

6. A scattering chamber comprising a first cylinder having a target therein, a second concentric cylinder, input means for directing an input beam of particles against said target so as to produce sub-atomic reaction products, output means for directing said products away from said target in the plane of said input beam, said first and second cylinders having overlapping longitudinally extending slots at right angles to each other for accommodating the translation of said output means therein, said cylinder having a helical slot for accommodating the translation of said input means therein so that said input means and first cylinder may be fixed while helical movement of said second cylinder permits the second cylinder to drive said output means simply, quickly, easily and continuously over a broad range of angles relative to said input means in a horizontal plane by communicating said output means continuously with said overlapping longitudinally extending slots.

7. A scattering chamber for observing nuclear reaction products produced therein by a horizontal nuclear beam, comprising input means for transmitting said beam, a first cylinder connected to said input means for the production of reaction products in said first cylinder and having a horizontal slot for the observation of said products, a second concentric cylinder having a helical slot in operable association with said input means so that the rotation of said second cylinder drives said second cylinder vertically, output means for rotation with said second cylinder around said first cylinder in line with said horizontal slot, and means permitting the relative vertical movement of said output means and said second cylinder whereby rotation of said output means translates said second cylinder vertically and maintains continuous communication of said output means and said horizontal slot for the continuous viewing of said reaction products over a broad range of angles to said input means.

8. A scattering chamber for observing nuclear reaction products produced therein by a horizontal nuclear beam, comprising input means for transmitting said beam, a first evacuated cylinder connected to said input means for the production of reaction products in said first cylinder and having a horizontal slot for the observation of said products, a second concentric cylinder having a helical slot in which said input means passes so that the rotation of said second cylinder drives said second cylinder vertically, output means rotatable with said second cylinder around said first cylinder in line with said horizontal slot, means permitting the relative vertical movement of said output means and said second cylinder, and elongated sealing means against the outside of said first cylinder including annuli which accommodate said input and output means respectively when said second cylinder is rotated whereby said output provides easy and continuous viewing of said reaction products over a broad range of angles from said input means without breaching the evacuation of said first cylinder.

9. In a fixed scattering chamber of the type having closed ends, a smooth cylindrical outside wall formed with a first slot therein that is transverse to the axis of said outside wall and a longitudinal extending fixed input first tube in the same plane as said transverse first slot for bombarding a target in said chamber so as to produce atomic reaction products therein, a moveable means for removing said products through said transverse slot at a wide range of angles to said input tube while blocking the flow of air from the outside of said chamber into the inside thereof, comprising an open ended rotatable second concentric cylinder adjacent said outside wall and having a helical second slot and a third slot that is adapted to overlap said transverse slot normally thereto, said helical second slot terminating short of the open ends of said second cylinder and being adapted to have its ends biased toward said fixed input tube, said second cylinder having a cover over said third slot with a hole therein and an output second tube passing therethrough which is adapted to be translated over the length of said transverse first slot and said third slot, said cover having resilient sealing means interposed between itself and said fixed cylinder and around said third slot, and said second cylinder having resilient sealing means interposed between said first and second cylinders and around said second slot thereby to block the flow of atmospheric air into said chamber while permitting the continuous free and easy translation of said output tube through a wide range of angles relative to said input tube for the removal of reaction products from said chamber.

References Cited in the file of this patent

UNITED STATES PATENTS

| | | |
|---|---|---|
| 2,924,715 | Hendee et al. | Feb. 9, 1960 |
| 3,005,098 | Buschmann et al. | Oct. 17, 1961 |